(12) United States Patent
Gao et al.

(10) Patent No.: US 10,315,281 B2
(45) Date of Patent: Jun. 11, 2019

(54) RECONFIGURABLE INTERFACE ASSEMBLY, ADAPTABLE ASSEMBLY LINE WORK-PIECE PROCESSOR, AND METHOD

(71) Applicant: GM GLOBAL TECHNOLOGY OPERATIONS LLC, Detroit, MI (US)

(72) Inventors: Dalong Gao, Rochester, MI (US); Lance T. Ransom, Essex (CA); Richard C. Janis, Grosse Pointe Woods, MI (US); Rodney L. Smith, Clinton Township, MI (US); Yhu-Tin Lin, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 321 days.

(21) Appl. No.: 15/281,596

(22) Filed: Sep. 30, 2016

(65) Prior Publication Data
US 2017/0036314 A1 Feb. 9, 2017

Related U.S. Application Data

(63) Continuation of application No. 14/087,999, filed on Nov. 22, 2013, now Pat. No. 9,700,976.
(Continued)

(51) Int. Cl.
*B23Q 1/00* (2006.01)
*B23Q 1/62* (2006.01)
(Continued)

(52) U.S. Cl.
CPC ............. *B23Q 1/621* (2013.01); *B23Q 3/062* (2013.01); *B23Q 3/103* (2013.01); *B25B 5/006* (2013.01);
(Continued)

(58) Field of Classification Search
CPC .. B25B 1/00; B25B 1/02; B25B 1/103; B25B 5/00; B25B 5/02; B25B 11/00
See application file for complete search history.

(56) References Cited

U.S. PATENT DOCUMENTS

| 4,013,280 A | * | 3/1977 | Chitayat | .................. | B23Q 1/40 |
| | | | | | 248/913 |
| 5,760,564 A | * | 6/1998 | Novak | ..................... | B23Q 3/00 |
| | | | | | 269/55 |

(Continued)

*Primary Examiner* — Lee D Wilson

(57) ABSTRACT

A reconfigurable interface assembly includes, but is not limited to, a first sub-assembly that is adapted for attachment to a work-piece supporter. The first sub-assembly includes a first brake. The reconfigurable interface assembly further includes a second sub-assembly attached to the first sub-assembly. The second sub-assembly is adapted for attachment to a work-piece manipulator. The second sub-assembly includes a second brake. The first sub-assembly is configured to move the second sub-assembly in a first direction with respect to the first sub-assembly and the first brake is configured to inhibit movement of the second sub-assembly in the first direction with respect to the first sub-assembly. The second sub-assembly is configured to move the first sub-assembly in a second direction with respect to the second sub-assembly and the second brake is configured to inhibit movement of the first sub-assembly in the second direction with respect to the first sub-assembly.

18 Claims, 16 Drawing Sheets

Related U.S. Application Data

(60) Provisional application No. 61/765,221, filed on Feb. 15, 2013.

(51) Int. Cl.
*B23Q 3/06* (2006.01)
*B23Q 3/10* (2006.01)
*B25B 5/00* (2006.01)
*B25B 5/06* (2006.01)

(52) U.S. Cl.
CPC ......... *B25B 5/062* (2013.01); *Y10T 29/49998* (2015.01); *Y10T 29/53974* (2015.01)

(56) References Cited

U.S. PATENT DOCUMENTS

| | | | |
|---|---|---|---|
| 7,156,384 B1 * | 1/2007 | Varnau | B23Q 3/066 269/20 |
| 8,181,799 B2 | 5/2012 | Laliberte et al. | |
| 8,783,674 B2 * | 7/2014 | Inoue | B65G 49/061 269/58 |
| 2014/0015185 A1 * | 1/2014 | Hishikawa | B23Q 1/037 269/58 |
| 2014/0230230 A1 * | 8/2014 | Gao | B23Q 1/621 29/559 |
| 2017/0036314 A1 * | 2/2017 | Gao | B23Q 1/621 |

* cited by examiner

RECONFIGURABLE INTERFACE ASSEMBLY, ADAPTABLE ASSEMBLY LINE WORK-PIECE PROCESSOR, AND METHOD

CROSS-REFERENCE TO RELATED APPLICATION

This application claims the benefit of U.S. Provisional Patent Application 61/765,221 filed 15 Feb. 2013 and U.S. application Ser. No. 14/087,999 filed 22 Nov. 2013 both entitled "Reconfigurable Interface Assembly, Adaptable Assembly Line Work-Piece Processor, and Method", which are hereby incorporated herein by reference in their entirety.

TECHNICAL FIELD

The technical field generally relates to manufacturing, and more particularly relates to a reconfigurable interface assembly for use in a manufacturing environment, an assembly line work-piece processor that includes the reconfigurable interface assembly, and a method of using the assembly line work-piece processor.

BACKGROUND

Conventional manufacturing utilizes work stations equipped with work-piece processors such as robots that perform manufacturing tasks on work-pieces. For example, a bare sheet metal door panel may arrive at a work station at an automotive assembly plant and after the robot performs its manufacturing task(s), it may leave the work station with additional components attached to it or it may be joined to a second work-piece, or the like.

To accomplish its manufacturing task(s), the robot will typically pick up the work-piece from a first location, known variously as a tool, a buck or a table, and will then move the work-piece to a second location where the manufacturing task(s) will be performed by the robot or by another work-piece processor or both or an operator. Afterwards, the work-piece may be moved to a third location where it can be retrieved by a second robot associated with a second work station.

To pick up, hold, and manipulate the work-piece, conventional robots utilize end effectors. An end effector conventionally includes a metal frame with pneumatic clamps mounted at positions that coincide with grab points on the work-piece. When the robot extends the end effector towards a table to reach for a work-piece, the pneumatic clamps will align with the grab points on the work-piece. When the pneumatic clamps are actuated, the robot can move and manipulate the work-piece.

Other types of conventional work-piece processors are also configured to accommodate a specific work-piece. For example, the table may also be equipped with pneumatic clamps that are configured to hold the work-piece and to present the work-piece at a known orientation. Other work-piece processors at the work station may also have clamps, alignment pins, applicators, or other devices that are aligned with specific portions of the work-piece. For example, a fender squaring fixture may be equipped with pneumatically actuated alignment pins that simulate the presence of bolts which may be temporarily extended by the fender squaring fixture and inserted into bolt holes in the work-piece. When inserted, the alignment pins can ensure proper alignment of the work-piece as the work-piece is joined to another component by the fender squaring fixture.

Because conventional work-piece processors are configured to accommodate a specific work-piece having a specific configuration, if a manufacturer desires to process different work-pieces at a work station, multiple work-piece processors and/or end effectors must be present at the work station. For example, if an automotive manufacturer wishes to process two different types of vehicle door panels at a single work station, then that work station will require two different tables, each table being tailored to grasp and present the two different door panels. The robot at the work station will require two different end effectors, each end effector being tailored to grasp and present the two different door panels.

While requiring the presence of two tables and two end effectors is an adequate solution, there is room for improvement. For example, if a manufacturer desired to process three, four, or more components through a single work station, the demand for floor space to accommodate multiple tables to support the work-piece and multiple tables to support each end effector may exceed the floor space that is available at the work station.

Earlier attempts to resolve this floor space limitation included providing a relocation device that was configured to be positioned between the pneumatic clamps and the frame of an end effector. The relocation device was configured to move the pneumatic clamps with respect to the frame of the end effector and in this manner, the end effector could be reconfigured to accommodate differently contoured work-pieces. The relocation device utilizes a large servo motor to reposition the pneumatic clamps and to hold the pneumatic clamps in place while they are clamped down on a work-piece.

Again, this solution is adequate, but leaves room for improvement. One limitation of this solution is that the servo motor is very large and, correspondingly, very heavy. Because each pneumatic clamp will require its own relocation device, the high weight of the relocation device is multiplied by the number of pneumatic clamps used by each robot. This, in turn, greatly adds to the weight that the robot is required to move and manipulate.

Accordingly, it is desirable to provide a lightweight device that allows each work-piece processor to adapt to accommodate multiple components having different configurations. In addition, it is desirable to provide a method of assembly line manufacture that allows the processing of multiple types of components through an assembly line work station having work-piece processors that are configured to adapt to accommodate differently configured component. Furthermore, other desirable features and characteristics of the present disclosure will become apparent from the subsequent detailed description and the appended claims, taken in conjunction with the accompanying drawings and the foregoing technical field and background.

SUMMARY

A reconfigurable interface assembly for use in a manufacturing environment is disclosed herein. Also disclosed herein is an adaptable assembly line work-piece processor that utilizes the reconfigurable interface assembly. Further disclosed herein is a method of assembly line manufacture that utilizes the adaptable assembly line work-piece processor.

In a first exemplary embodiment, the reconfigurable interface assembly includes, but is not limited to, a first sub-assembly that is adapted for attachment to a work-piece supporter. The first sub-assembly includes a first brake. The reconfigurable interface assembly further includes a second sub-assembly attached to the first sub-assembly. The second sub-assembly is adapted for attachment to a work-piece manipulator. The second sub-assembly includes a second brake. The first sub-assembly is configured to move the second sub-assembly in a first direction with respect to the first sub-assembly and the first brake is configured to inhibit movement of the second sub-assembly in the first direction with respect to the first sub-assembly. The second sub-assembly is configured to move the first sub-assembly in a second direction with respect to the first sub-assembly and the second brake is configured to inhibit movement of the first sub-assembly in the second direction with respect to the first sub-assembly.

In a second exemplary embodiment, the adaptable assembly line work-piece processor includes, but is not limited to, a work-piece supporter. The adaptable assembly line work-piece processor further includes a reconfigurable interface assembly attached to the work-piece supporter. The adaptable assembly line work-piece processor still further includes a work-piece manipulator attached to the reconfigurable interface assembly. The work-piece supporter, the reconfigurable interface assembly, and the work-piece manipulator are configured to cooperate to sequentially support and manipulate a plurality of differently configured work-pieces.

In a third exemplary embodiment, the method of assembly line manufacture includes the step of adapting an adaptable assembly line piece processor to receive a first work-piece. The adaptable assembly line piece processor includes a reconfigurable interface assembly. The method further includes receiving the first work-piece at the adaptable assembly line piece processor. The method further includes performing an assembly line task involving the first work-piece. The method further includes removing the first work-piece from the adaptable assembly line piece processor. The method still further includes adapting the adaptable assembly line piece processor to receive a second work-piece by reconfiguring the reconfigurable interface assembly. The second work-piece has a different configuration than the first work-piece.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

A reconfigurable interface assembly is disclosed herein. In some exemplary embodiments, the reconfigurable interface assembly is configured to be positioned between a work-piece supporter (e.g., a table, a robot, a fender squaring fixture) and a work-piece manipulator (e.g., pneumatic clamps, alignment pins). Examples of this arrangement can best be seen in FIGS. 8, 9, and 12, discussed in detail, below. The reconfigurable interface assembly is configured to enable movement of the work-piece manipulator with respect to the work-piece supporter. This allows the work-piece manipulator to be repositioned to accommodate differently configured work-pieces. In some exemplary embodiments, the reconfigurable interface assembly permits the work-piece manipulators to translate between positions. In other exemplary embodiments, the reconfigurable interface assembly permits the work-piece manipulators to rotate between positions. In other exemplary embodiments, the reconfigurable interface assembly permits the work-piece manipulators to both translate and rotate between positions. In still other exemplary embodiments, the reconfigurable interface assembly is configured to permit three-dimensional movement such that the work-piece manipulators may be repositioned along an X-axis, a Y-axis, and a Z-axis.

In some exemplary embodiments, the reconfigurable interface assembly will include a plurality of rails to guide the movement of the work-piece manipulator. The reconfigurable interface assembly will also include a corresponding plurality of brakes that are configured to engage the rails. When the brakes are locked, movement of the work-piece manipulator is inhibited. When the brakes are unlocked, movement of the work-piece manipulator is permitted. In some embodiments, the reconfigurable interface assembly may also include a motor, such as, but not limited to a servo motor, that is configured to move the work-piece manipulator. Thus, when the brakes are unlocked and the motor is actuated, the work-piece manipulator will be moved between positions by the motor. Conversely, when the brakes are locked and the motor is deactivated, the work-piece manipulator will be held in a stationary position by the brakes.

A greater understanding of the embodiments of the apparatuses and methods disclosed herein may be obtained through a review of the illustrations accompanying this disclosure together with a review of the detailed description that follows.

Figure 1:
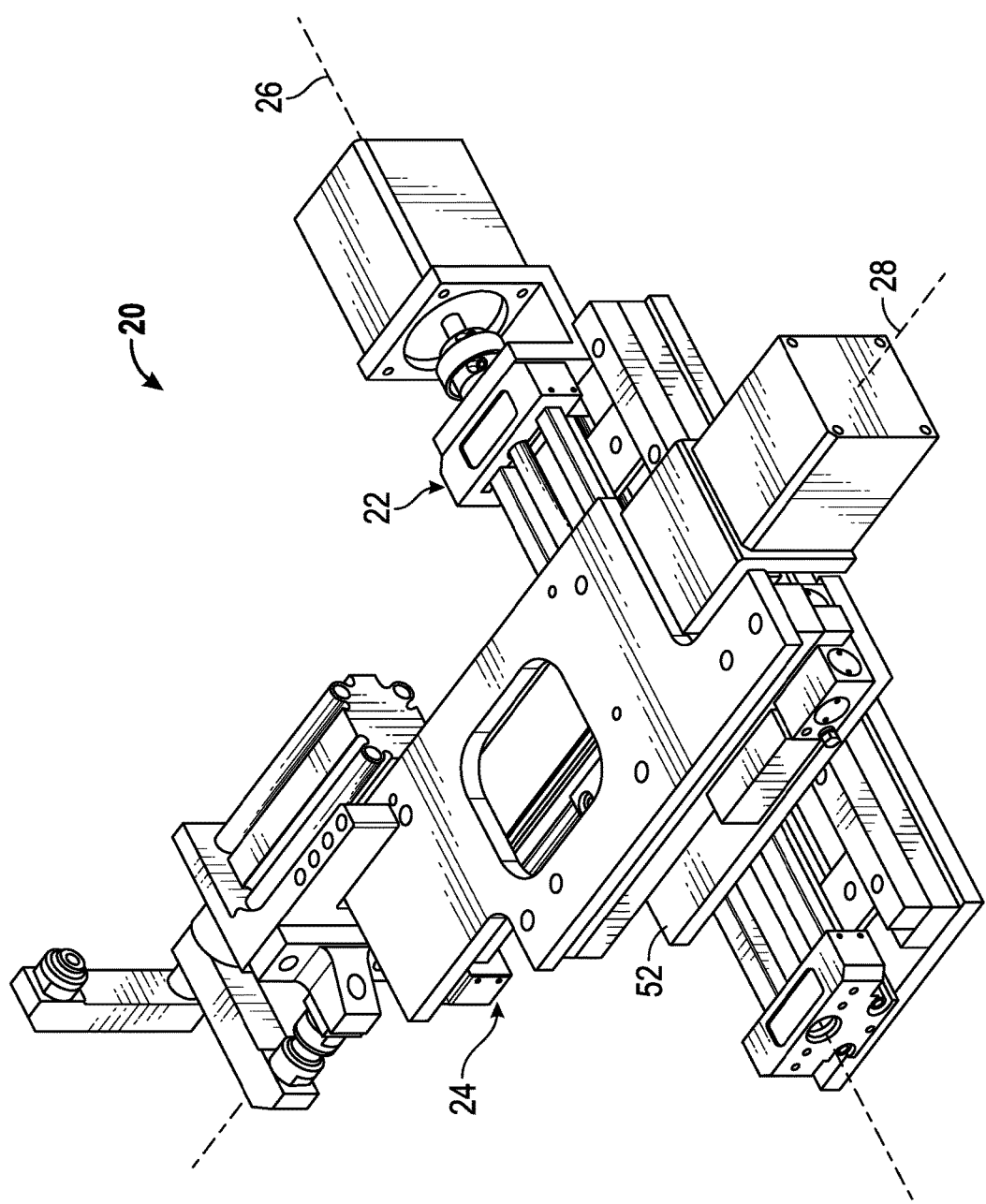
FIG. 1 is a perspective view illustrating an exemplary embodiment of a reconfigurable interface assembly made in accordance with the various teachings of the present disclosure.

FIG. 1 is a perspective view illustrating an exemplary embodiment of a reconfigurable interface assembly 20 made in accordance with the teachings of the present disclosure. Reconfigurable interface assembly 20 includes a sub-assembly 22 and a sub-assembly 24. In the illustrated embodiment, sub-assembly 22 and sub-assembly 24 are substantially identical. In other embodiments, they do not need to be identical. Sub-assembly 22 and sub-assembly 24 are oriented so that they face one another and are aligned at substantially perpendicular angles with respect to one another. In other embodiments, they may be mounted and/or aligned in any suitable manner.

Reconfigurable interface assembly 20 is configured to be attached between a work-piece supporter (e.g. a robot) and a work-piece manipulator (e.g. a pneumatic clamp). Sub-assembly 22 is configured to move sub-assembly 24 linearly along longitudinal axis 26 and sub-assembly 24 is configured to move sub-assembly 22 linearly along longitudinal axis 28. When reconfigurable interface assembly 20 is attached between a work-piece supporter and a work-piece manipulator, reconfigurable interface assembly 20 is capable of moving the work-piece manipulator in a first direction along an X-axis and also in a second direction along a Y-axis with respect to the work-piece supporter. This permits the work-piece manipulator to reach and extend to different lengths and in different directions to accommodate differently configured work-pieces (i.e., work-pieces having different sizes, shapes, contours, attachments, features, or any other deviation from one another that would require repositioning of the work-piece manipulators).

In other exemplary embodiments, a third sub-assembly (not shown) may be employed to permit movement of the work-piece manipulator along a Z-axis. Such a third sub-assembly would be oriented at an angle that is perpendicular to both sub-assembly 22 and sub-assembly 24. In still other embodiments, rather than providing linear translation, the sub-assemblies may be configured to provide pivotal or rotational movement. In still other embodiments, the sub-assemblies may be configured to provide a combination of both linear translation and rotational movement.

Figure 2:
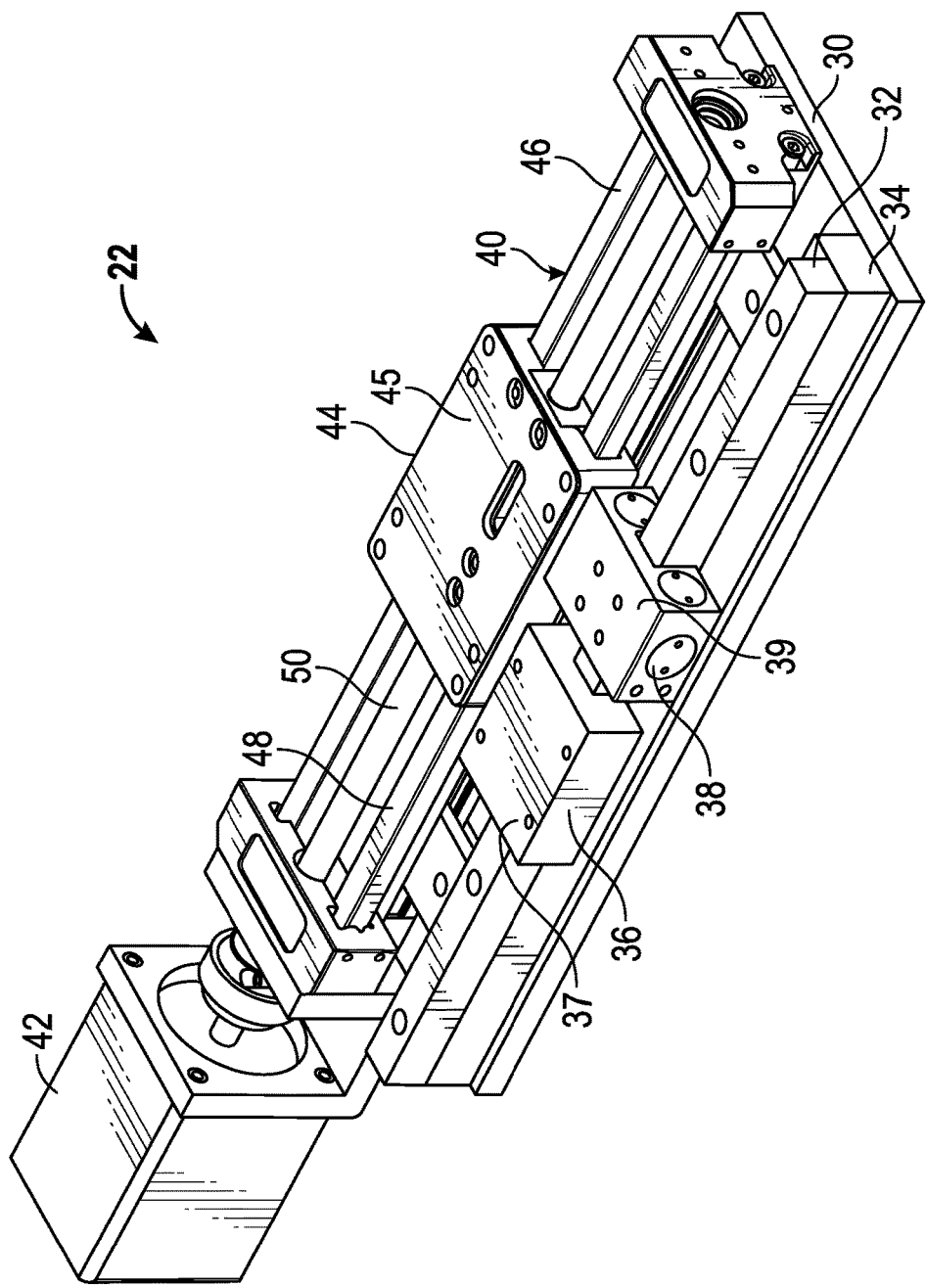
FIG. 2 is a perspective view illustrating a sub-assembly of the reconfigurable interface assembly of FIG. 1.

FIG. 2 is a perspective view illustrating sub-assembly 22. With continuing reference to FIG. 1, the various components and functions of sub-assembly 22, discussed below, are substantially identical to the components and functions of sub-assembly 24. Accordingly, the description provided below for sub-assembly 22 applies equally to sub-assembly 24. To the extent that there are any distinctions between sub-assembly 22 and sub-assembly 24, they will be identified in the discussion of sub-assembly 22.

Figure 3:
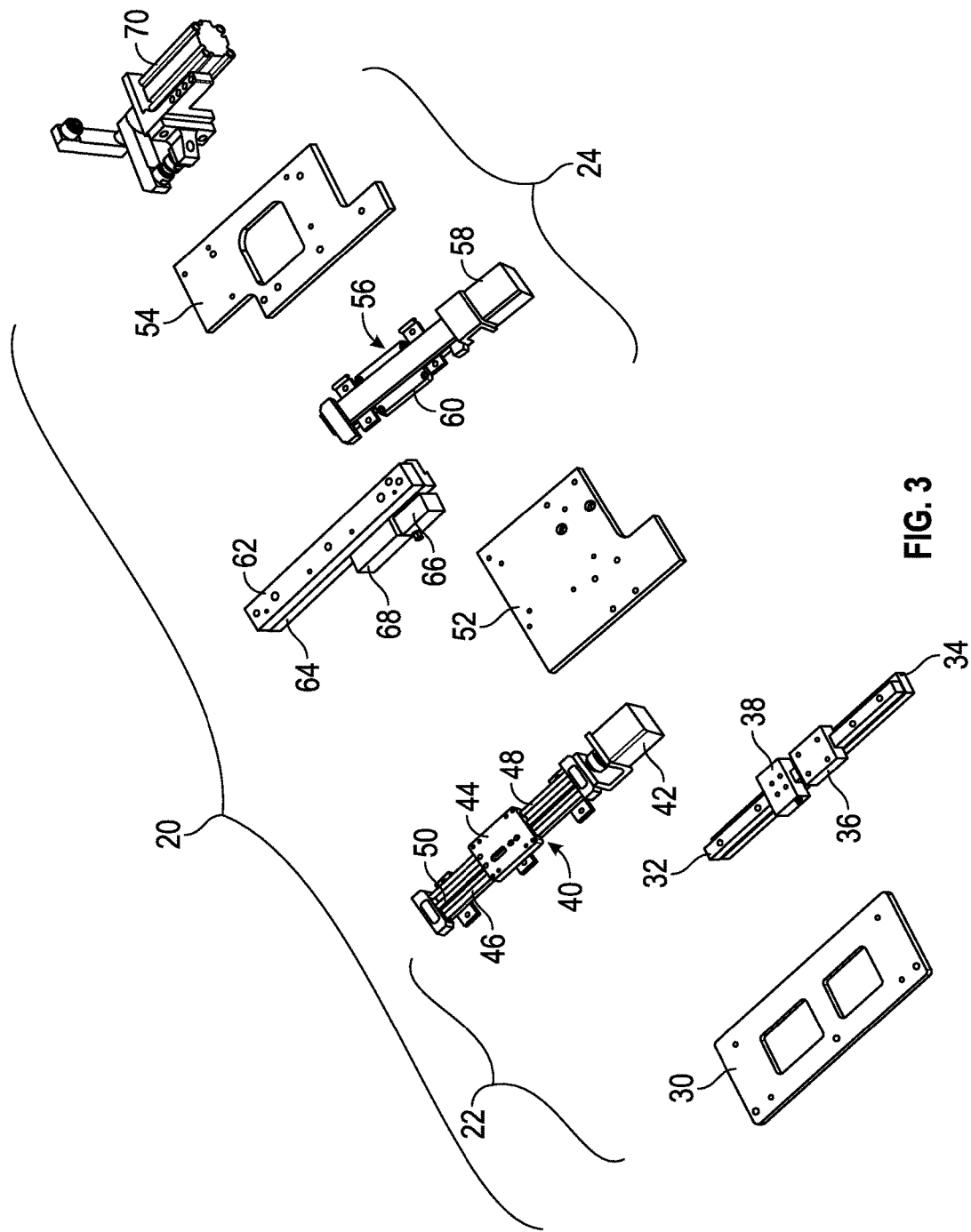
FIG. 3 is an exploded view illustrating the reconfigurable interface assembly of FIG. 1.

Sub-assembly 22 includes a base plate 30 onto which the other components of sub-assembly 22 are coupled, mounted or connected. Base plate 30 may comprise any suitable material including, but not limited to metals, ceramics, polymers, and other material of suitable strength. Base plate 30 is configured for coupling attachment to a work-piece supporter. Such attachment may be accomplished in any conventional manner including, but not limited to the use of threaded fasteners, bolts, clamps, dowel pins and the like. Once base plate 30 is coupled or attached to a work-piece supporter, base plate 30 will not move with respect to the work-piece supporter. As is shown in FIG. 3, a base plate 54 is coupled or attached to sub-assembly 24. Base plate 54 has a different configuration than base plate 30 (base plate 54 has cut-outs at locations where base plate 30 does not) which facilitates coupling of sub-assembly 24 to the work-piece manipulator.

Sub-assembly 22 further includes a rail 32 that is connected to base plate 30 via a rail support member 34. A carriage 36 engages rail 32 and is configured to move or slide back and forth along rail 32. Rail 32 and carriage 36 may comprise any suitable material including, but not limited to metals (such as, but not limited to, steel), ceramics, polymers (including, but not limited to, plastics), and any other suitable material of sufficient strength. An upper surface 37 of carriage 36 is substantially flat and is configured for coupling to a middle mounting plate 52 (see FIG. 1) as discussed below.

Sub-assembly 22 further includes a brake, such as, but not limited to, a pneumatic brake 38 engaged with rail 32. In other exemplary embodiments, other types of braking mechanisms may be employed. Pneumatic brake 38 is configured to operate in either a locked state or an unlocked state, and is further configured to remain in a locked state until it is actuated by a flow of air. When the flow of air is detected, pneumatic brake 38 enters the unlocked state and is free to slide back and forth along rail 32. When the air flow ceases, pneumatic brake 38 will automatically return to the locked state. An upper surface 39 of pneumatic brake 38 is substantially flat and is substantially co-planar with upper surface 37 of carriage 36. The upper surface 39 of pneumatic brake 38 is configured for attachment to middle mounting plate 52 (see FIG. 1), as discussed below.

Sub-assembly 22 further includes a leadscrew linear slide 40 including a motor 42, a slide carriage 44, a guide rail 46, a guide rail 48, and a lead screw 50. Slide carriage 44 is configured to engage guide rails 46 and 48 and lead screw 50. Motor 42 is configured to engage lead screw 50 and to rotate lead screw 50 when motor 42 is actuated. As lead screw 50 is rotated, slide carriage 44 moves back and forth along guide rails 46 and 48 in a direction that corresponds with the rotation of lead screw 50. As illustrated in FIG. 2, Leadscrew linear slide 40 is aligned to be substantially parallel to rail 32.

An upper surface 45 of slide carriage 44 is substantially flat and is substantially coplanar with upper surface 37 of carriage 36 and with upper surface 39 pneumatic brake 38. This configuration permits a middle mounting plate 52 (see FIG. 1) to be coupled to the upper surfaces 37, 39, and 45. When middle mounting plate 52 is coupled to upper surfaces 37, 39, and 45, middle mounting plate 52 links the movement of carriage 36 and pneumatic brake 38 along rail 32 together with the movement of slide carriage 44 along guide rails 46 and 48. Thus, when motor 42 rotates lead screw 50, this causes movement of not only slide carriage 44, but also movement of carriage 36, pneumatic brake 38, and middle mounting plate 52. Similarly, when pneumatic brake 38 is in the locked state, it not only inhibits its own movement along rail 32, but it also inhibits the movement of carriage 36, slide carriage 44, and middle mounting plate 52. Thus, the coupling of middle mounting plate 52 to the upper surfaces of carriage 36, pneumatic brake 38, and slide carriage 44 causes these four components to move together as a single unit. Accordingly, when pneumatic brake 38 is in the unlocked state and motor 42 is actuated, carriage 36, pneumatic brake 38, slide carriage 44, and middle mounting plate 52 move together as a single unit. Conversely, when pneumatic brake 38 is in the locked state, carriage 36, pneumatic brake 38, slide carriage 44, and middle mounting plate 52 are inhibited from movement.

As illustrated in FIGS. 1-2, sub-assembly 22 and sub-assembly 24 are positioned to face one another such that upper surfaces 37, 39, and 45 are facing the upper surfaces of the carriage, the pneumatic brake, and the slide carriage of sub-assembly 24. Middle mounting plate 52 is coupled to upper surfaces 37, 39, and 45 and also to the upper surfaces of the carriage, pneumatic brake, and slide carriage of sub-assembly 24. When joined in this manner, middle mounting plate 52 further links movement of sub-assembly 24 with the movement of slide carriage 44, carriage 36 and pneumatic brake 38. Thus, when pneumatic brake 38 is in the unlocked state and motor 42 is actuated, then middle mounting plate 52 will move sub-assembly 24 with respect to sub-assembly 22 when slide carriage 44 moves along guide rails 46 and 48. Similarly, when pneumatic brake 38 is in the locked state, then middle mounting plate 52 will inhibit movement of sub-assembly 24 with respect to sub-assembly 22. Conversely, middle mounting plate 52 will cause the movement of, and will inhibit the movement of sub-assembly 22 with respect to sub-assembly 24 when the slide carriage of sub-assembly 24 moves and when the pneumatic brake of sub-assembly 24 is in the locked state, respectively.

The configuration just described allows both sub-assemblies 22 and 24 to move one another and further allows sub-assemblies 22 and 24 to be moved by one another. Thus, when reconfigurable interface assembly 20 is attached to a work-piece processor, this respective movement of sub-assemblies 22 and 24 allows reconfigurable interface assembly 20 to adapt and adjust to accommodate differently configured work-pieces. For example, when sub-assembly 22 is mounted to a work-piece supporter and sub-assembly 24 is mounted to a work-piece manipulator, movement of the slide carriage of either sub-assembly will cause not only movement of one sub-assembly with respect to the other, but will also cause movement of the work-piece manipulator with respect to the work-piece supporter. Similarly, when the pneumatic brake of each sub-assembly is in the locked state, it will not only inhibit respective movement of each sub-assembly with respect to the other, but it will also inhibit movement of the work-piece manipulator with respect to the work-piece supporter. Thus, when the pneumatic brake of each sub-assembly is in the locked state, the work-piece manipulator can be held in a position that allows it to manipulate a first component. When the work-piece processor is done performing its manufacturing task on that first component, the pneumatic brake of each sub-assembly can be placed in the unlocked state and the motors of each sub-assembly can be actuated to move the work-piece manipulator to a different position along both an X-axis and a Y-axis. Once the work-piece manipulator has been repositioned, the pneumatic brakes of each sub-assembly can be returned to the locked state thus enabling the work-piece manipulator to be held in a new position that allows it to manipulate a second component having different dimensions/shapes/contours/attachments/etc. than those of the first component.

With continuing reference to FIGS. 1-2, FIG. 3 is an exploded view showing the various components of reconfigurable interface assembly 20. As illustrated, sub-assembly 24 includes substantially the same components as sub-assembly 22. For example, sub-assembly 24 includes base plate 54, a leadscrew linear slide 56 including a motor 58 (guide rails and lead screw are included but not visible in the rear view presented in FIG. 3), a slide carriage 60, a rail support 62, a rail 64, a pneumatic brake 66, and a carriage 68. Base plate 54, ball screw linear slide 56, motor 58, slide carriage 60, rail support 62, rail 64, pneumatic brake 66, and carriage 68 are substantially identical to, and function in substantially the same manner as base plate 30, leadscrew linear slide 40, motor 42, slide carriage 44, rail support 34, rail 32, pneumatic brake 38 and carriage 36, respectively. The only distinction between sub-assembly 22 and sub-assembly 24 is the shape of base plate 54 as compared with base plate 30. Base plate 54 includes cut-outs that facilitate mounting a pneumatic clamp 70 to base plate 54.

Figure 4:
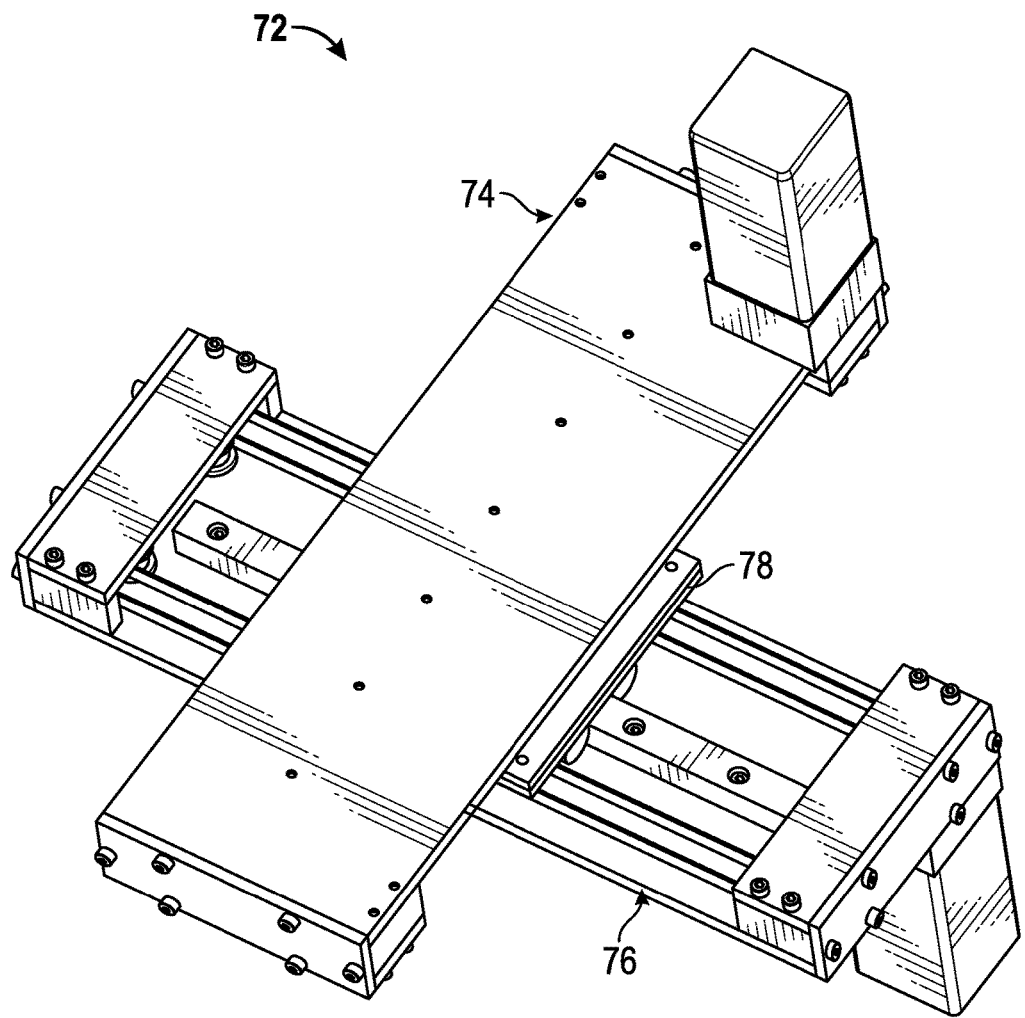
FIG. 4 is a perspective view illustrating another exemplary embodiment of a reconfigurable interface assembly made in accordance with the various teachings of the present disclosure.
Figure 5:
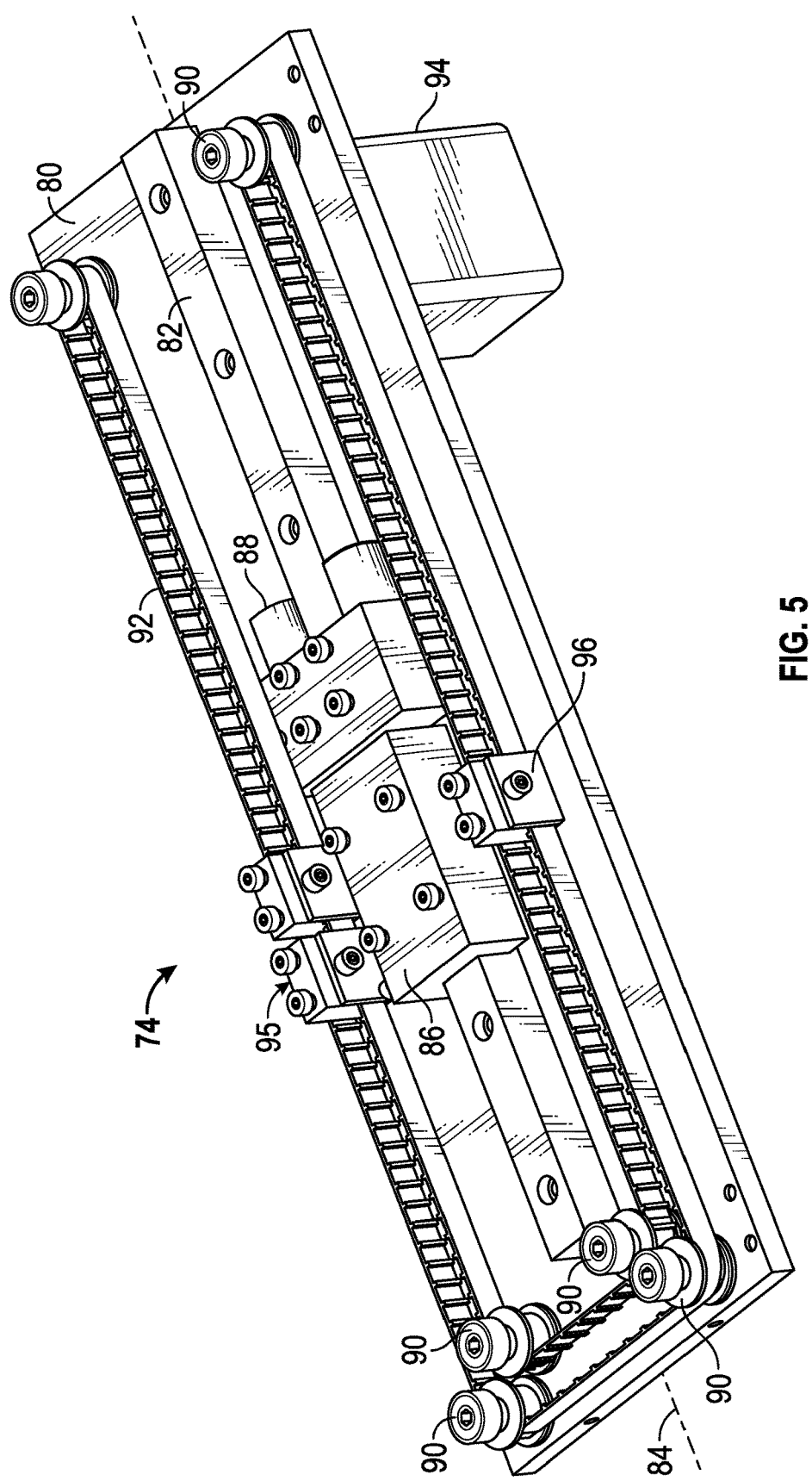
FIG. 5 is a perspective view illustrating a sub-assembly of the reconfigurable interface assembly of FIG. 4.
Figure 6:
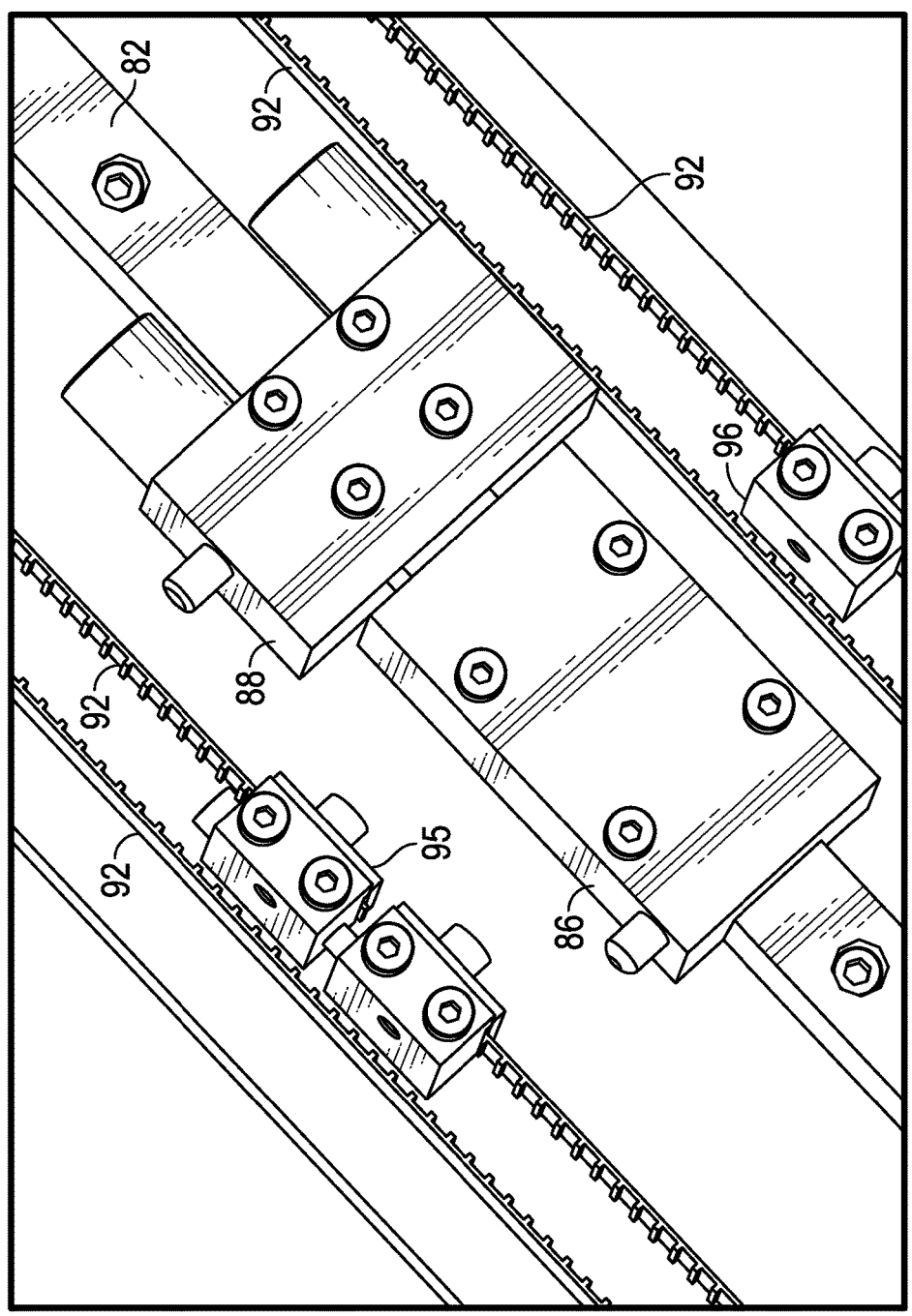
FIG. 6 is an expanded perspective view illustrating a portion of the sub-assembly of FIG. 5.

FIGS. 4-6 illustrate an alternate exemplary embodiment of a reconfigurable interface assembly 72. Reconfigurable interface assembly 72 is configured to be coupled between a work-piece supporter and a work-piece manipulator. With reference to FIG. 4, reconfigurable interface assembly 72 includes two substantially identical sub-assemblies, a sub-assembly 74 and a sub-assembly 76. Sub-assembly 74 and sub-assembly 76 are positioned to face one another, are each coupled or mounted to a middle mounting plate 78, and are configured to move one another in order to reposition the work-piece manipulator with respect to the work-piece supporter.

With reference to FIG. 5, an expanded view of sub-assembly 74 is illustrated with several cover plates and middle mounting plate 78 removed to permit observation of the drive components. A base plate 80 serves as a platform to which other components of sub-assembly 74 are coupled. A single guide rail 82 is mounted to base plate 80 and extends in a direction that is substantially aligned with a longitudinal axis 84 of base plate 80. A carriage 86 and a pneumatic brake 88 engage guide rail 82 and are configured to move or slide back and forth along guide rail 82. Pneumatic brake 88 is configured to operate in a locked and an unlocked state. While in the unlocked state, pneumatic brake 88 is free to slide along guide rail 82 and when in the locked state, pneumatic brake 88 engages guide rail 82 in a manner that inhibits pneumatic brake 88 from sliding along guide rail 82.

Sub-assembly 74 further includes a plurality of spools 90 and a drive belt 92. In some embodiments, drive belt 92 may include teeth that are configured to engage grooves in spools 90. A motor 94 is coupled to an underside of base plate 80 and is coupled to one of the spools 90. Motor 94 is configured to rotate that spool and, in turn, to cause movement of drive belt 92. Drive belt 92 is arranged around spools 90 in a manner that forms a "U" shape. Use of this configuration is disclosed in U.S. Pat. No. 8,181,799, which is hereby incorporated herein by reference. Opposite ends of drive belt 92 are attached to linking assembly 95. Linking assembly 95 is configured to receive the ends of drive belt 92 and to adjust the tension thereon. When motor 94 is actuated, belt 92 will move and linking assembly 95 will move back and forth together with drive belt 92. A belt engagement member 96 is positioned on another portion of drive belt 92 and will also move back and forth together with drive belt 92.

Upper surfaces of carriage 86, pneumatic brake 88, linking assembly 95, and belt engagement member 96 are substantially flat and are configured for attachment to middle mounting plate 78. When middle mounting plate 78 is attached to the upper surfaces of these components, carriage 86, pneumatic brake 88, linking assembly 95 and belt engagement member 96 will move together as a single unit. Thus, when motor 94 is actuated and when pneumatic brake 88 is in the unlocked state, then linking assembly 95, belt engagement member 96, carriage 86, pneumatic brake 88, and middle mounting plate 78 will all move back and forth together with respect to base plate 80. Similarly, when pneumatic brake 88 is in the locked state, movement of linking assembly 95, belt engagement member 96, carriage 86, pneumatic brake 88, and middle mounting plate 78 with respect to base plate 80 will be inhibited. When sub-assembly 76 is attached to middle mounting plate 78, sub-assembly 74 can control movement of sub-assembly 76 with respect to sub-assembly 74 and vice versa.

FIG. 6 illustrates an expanded view of a portion of sub-assembly 74 from a different angle. In this view, it can be observed that linking assembly 95 is coupled to an inner portion of the "U" formed by drive belt 92 and that belt engagement portion 96 is coupled to an outer portion of the "U" formed by belt 92.

Figure 7:
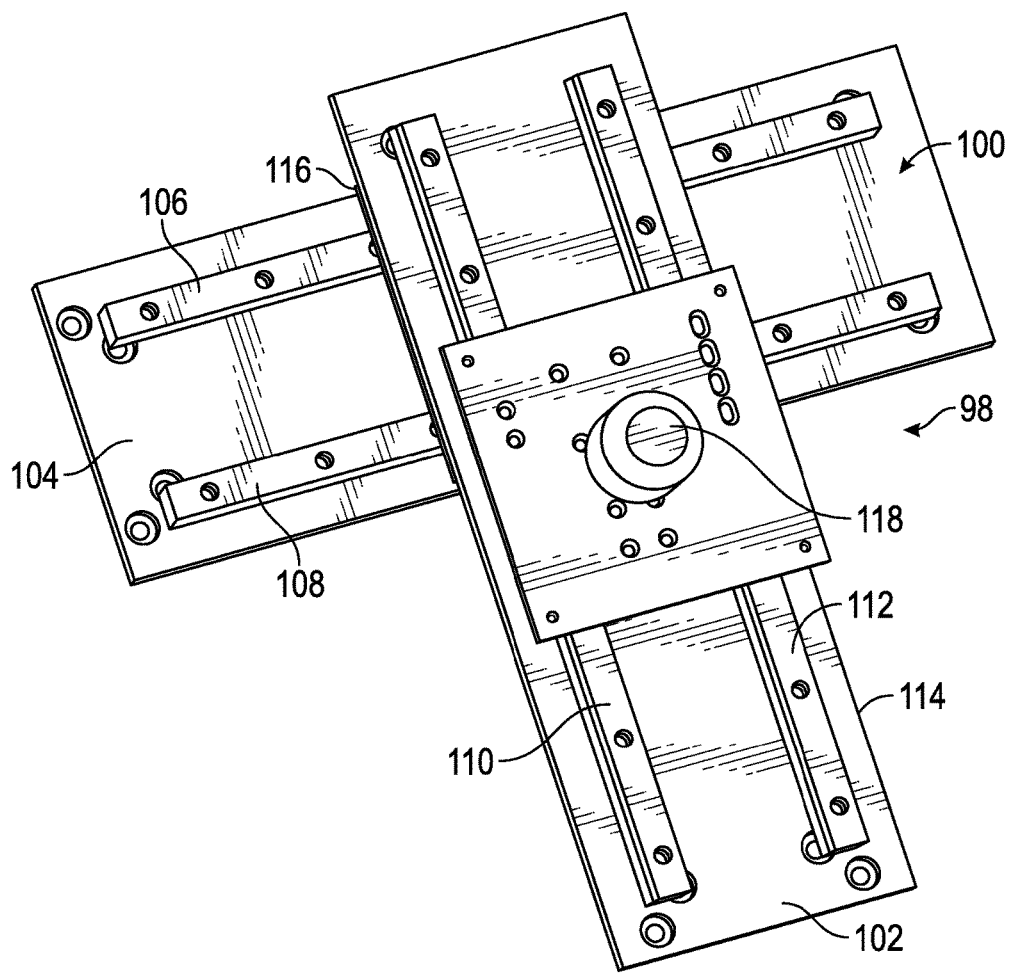
FIG. 7 is a perspective view illustrating another exemplary embodiment of a reconfigurable interface assembly made in accordance with the various teachings of the present disclosure.

FIG. 7 is a perspective view of another exemplary embodiment of a reconfigurable interface assembly 98. With continuing reference to FIGS. 1-6, as with reconfigurable interface assemblies 20 and 72, reconfigurable interface assembly 98 includes a sub-assembly 100 and a sub-assembly 102 arranged at substantially transverse angles to one another. Sub-assembly 100 includes a base plate 104. A guide rail 106 and a guide rail 108 are coupled to base plate 104. Sub-assembly 102 includes a guide rail 110 and a guide rail 112, each coupled to a base plate 114. Sub-assembly 100 and sub-assembly 102 are coupled together by middle mounting plate 116. Sub-assembly 100 and sub-assembly 102 each include a pneumatic brake mounted to a respective guide rail to inhibit movement of each sub-assembly with respect to one another (these pneumatic brakes are hidden by base plate 114 and middle mounting plate 116, but are similar in configuration to pneumatic brake 38 illustrated in FIG. 2).

Unlike reconfigurable interface assembly 20 and reconfigurable interface assembly 72, reconfigurable interface assembly 98 does not include any motors to move the sub-assemblies with respect to one another. Rather, when a work-piece processor is finished performing a manufacturing task and the next work-piece has a different configuration that requires that reconfigurable interface assembly 98 be reconfigured, the robot or other work-piece processor associated with the work station will adjust reconfigurable interface assembly 98 by engaging an engagement peg 118 and moving sub-assembly 100 and sub-assembly 102 as needed. In other embodiments, the robot or other work-piece processor may engage reconfigurable interface assembly 98 in any suitable manner that permits reconfiguration. During such reconfiguration by the robot or other work-piece processor, each pneumatic brake will be in the unlocked state and once the robot or other work-piece processor has completed the reconfiguration, each pneumatic brake will return to the locked state to ensure that reconfigurable interface assembly 98 remains configured to accommodate the next work-piece.

Figure 8:
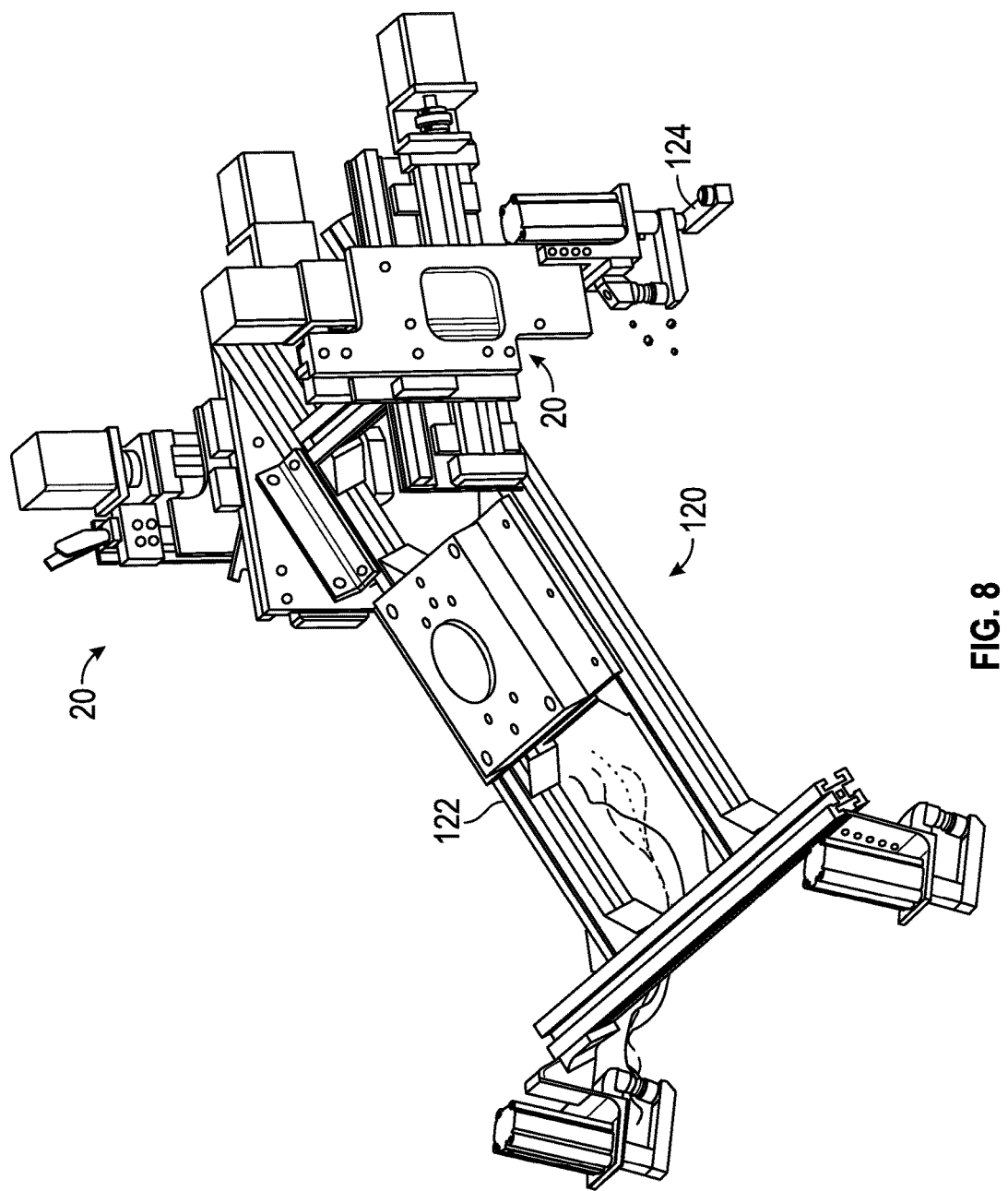
FIG. 8 is a perspective view illustrating an exemplary end effector equipped with the reconfigurable interface assembly of FIG. 1.

FIG. 8 is a perspective view illustrating an exemplary end effector 120. End effector 120 includes an end effector frame 122 that is configured to support a work-piece and further includes a pair of pneumatic clamps 124 that are configured to manipulate the work-piece. End effector 120 is further equipped with a pair of reconfigurable interface assemblies 20, as described above with respect to FIGS. 1-3. Each reconfigurable interface assembly 20 is attached to end effector 120 in a positioned between end effector frame 122 and the pair of pneumatic clamps 124. Thus, in the embodiment illustrated in FIG. 8, pair of pneumatic clamps 124 can move and along an X-axis and a Y-axis with respect to end effector frame 122.

Figure 9:
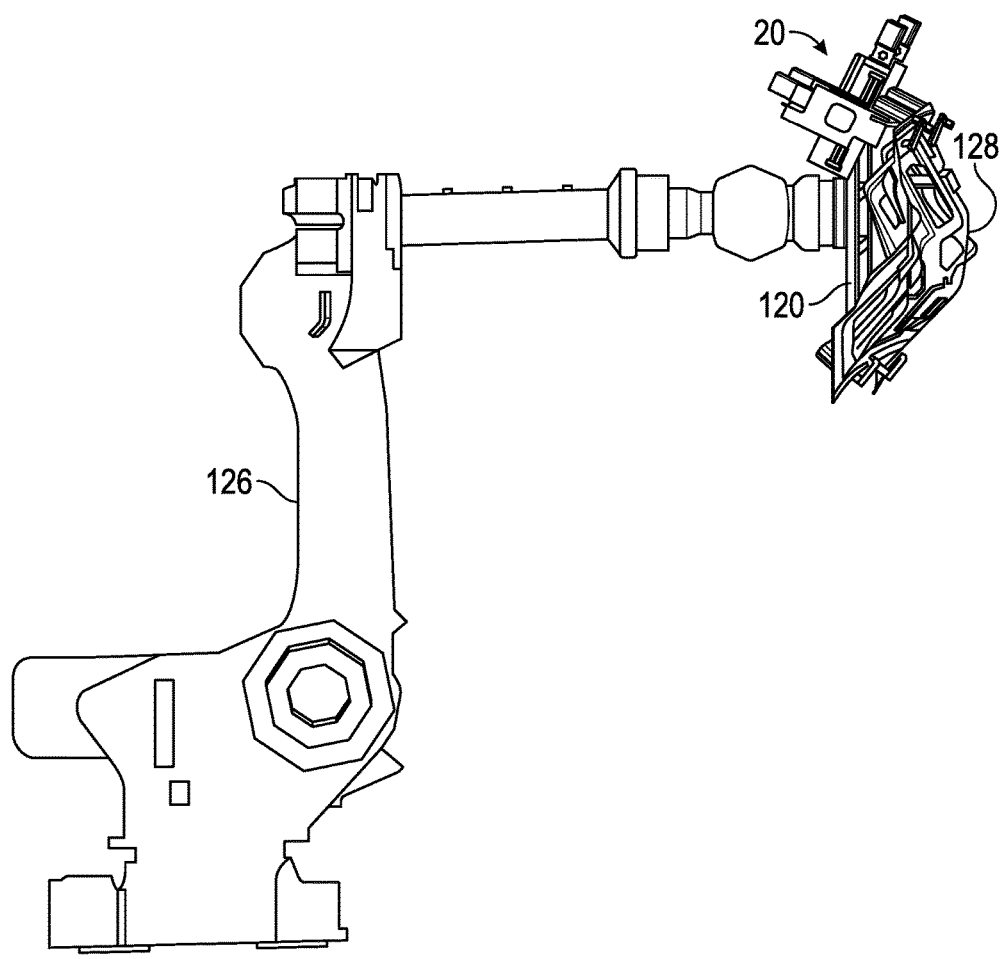
FIG. 9 is a perspective view illustrating an exemplary robot equipped with the end effector of FIG. 8.

FIG. 9 illustrates an exemplary configuration of an adaptable assembly line work-piece processor utilizing the reconfigurable interface assembly of the present disclosure. In one example, a robot 126 comprises the work-piece processor and is illustrated equipped with end effector 120. End effector 120 has utilized reconfigurable interface assembly 20 to position a pair of pneumatic clamps 124 (see FIG. 8) so as to permit end effector 120 to grip a body panel 128.

Figure 10:
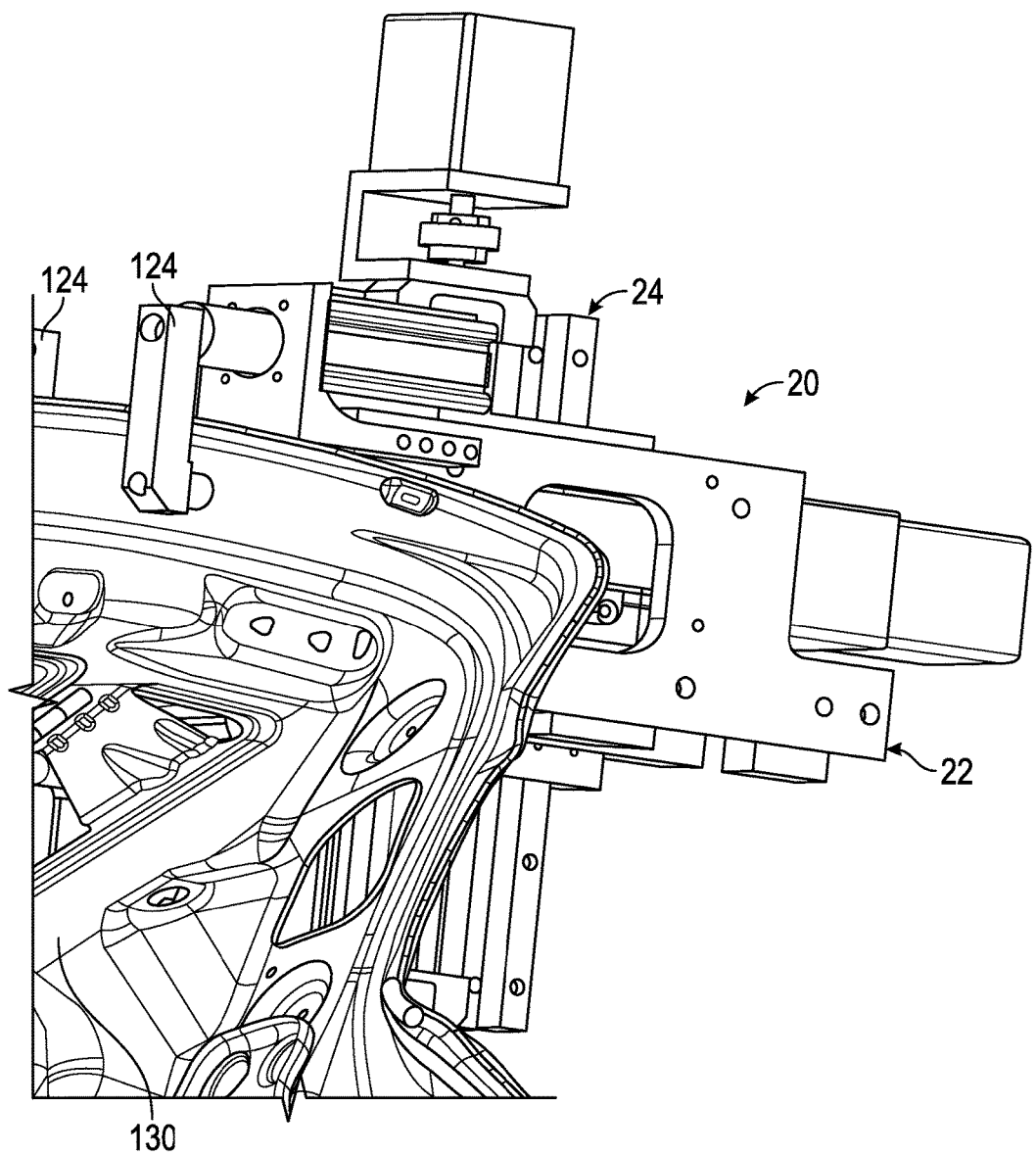
FIGS. 10-11 are perspective views illustrating the end effector of FIG. 8 grasping differently configured work-pieces.
Figure 11:
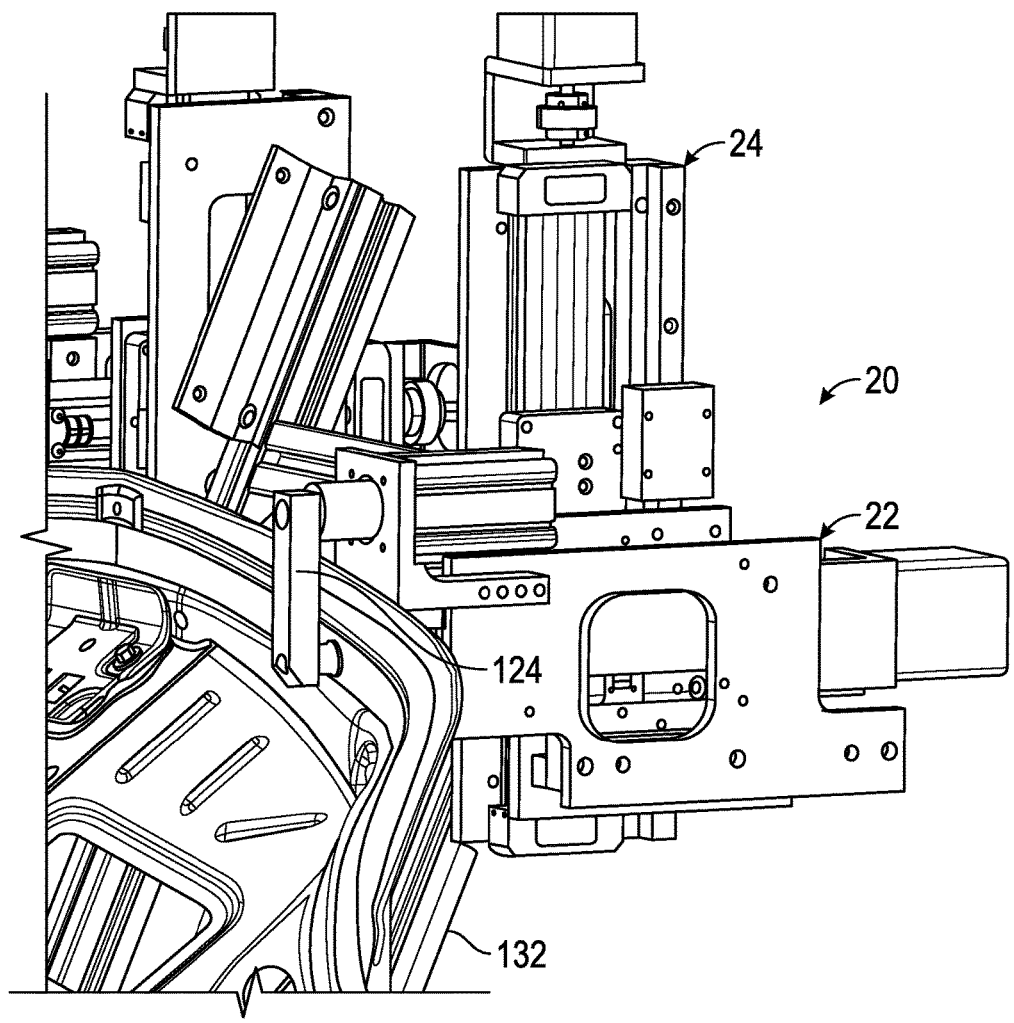

FIGS. 10-11 illustrate end effector 120 gripping two different body panels. In FIG. 10, reconfigurable interface assembly 20 is adjusted in a first position that enables pair of pneumatic clamps 124 to grasp a first body panel 130. In FIG. 11, reconfigurable interface assembly 20 is adjusted in a second position that enables pair of pneumatic clamps 124 to grasp a second body panel 132. In this manner, end effector 120 can be used to accommodate any number of differently configured work-pieces without the need to have a different end effector for each respective work-piece. This, in turn, conserves floor space at the work station where end effector 120 is utilized.

Figure 12:
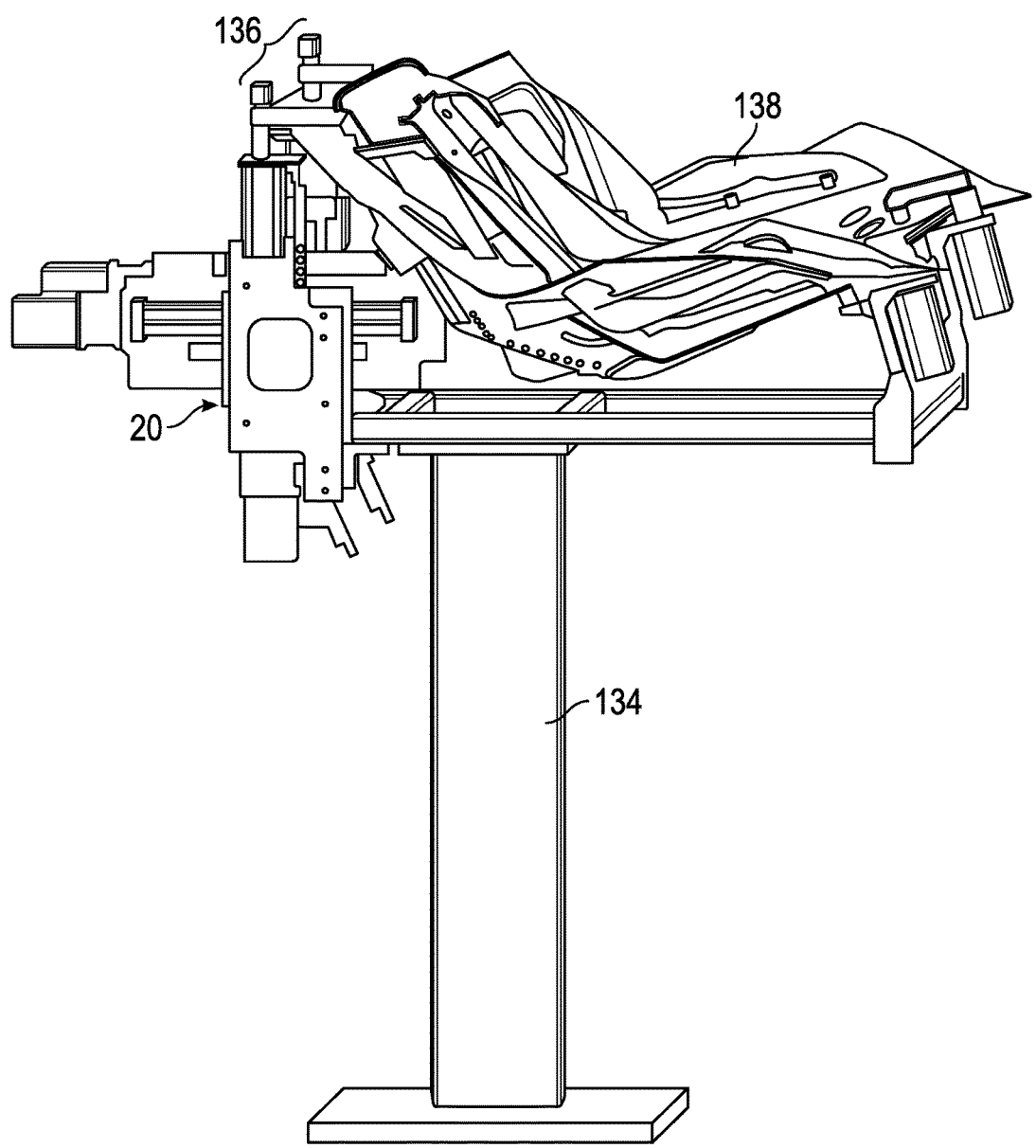
FIG. 12 is a perspective view illustrating a table equipped with the reconfigurable interface assembly of FIG. 1 presenting a work-piece.

FIG. 12 illustrates a table 134 that is configured to support a work-piece for retrieval by a robot at a work station. As illustrated, reconfigurable interface assembly 20 is attached between table 134 and pair of pneumatic clamps 136. Thus, in this example, the table 134 comprises the work-piece processor. Reconfigurable interface assembly 20 supports pair of pneumatic clamps 136 at a location that accommodates body panel 138. Reconfigurable interface assembly 20 may be adjusted to reposition pair of pneumatic clamps 136 to accommodate other body panels having different configurations. In this manner, table 134 can be used to accommodate any number of differently configured work-pieces without the need to have a different table for each respective work-piece. This, in turn, conserves floor space at the work station where table 134 is utilized.

Figure 13:
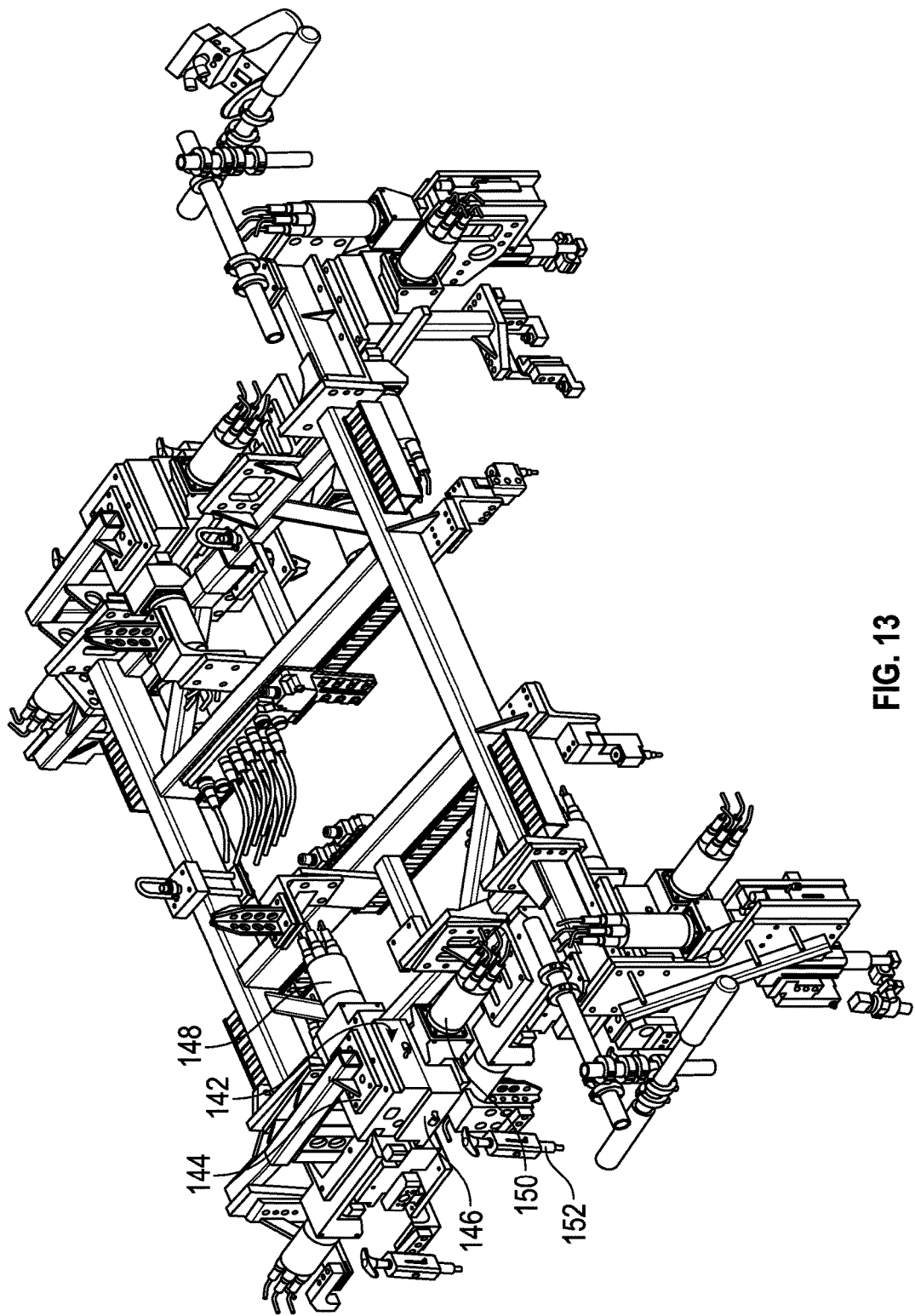
FIG. 13 is a perspective view illustrating a fender squaring fixture equipped with an exemplary embodiment of a reconfigurable interface assembly.

FIG. 13 illustrates a fender squaring fixture 140 equipped with another exemplary embodiment of a reconfigurable interface assembly 142. Reconfigurable interface assembly 142 includes a sub-assembly 144 and a sub-assembly 146 attached to one another and configured to move one another along an X-axis direction and a Y-axis direction, respectively. Sub-assembly 144 includes a motor 148 to control movement of sub-assembly 146 and sub-assembly 146 includes a motor 150 to control movement of sub-assembly 144.

Fender squaring fixture 140 is configured to ensure proper alignment between various body components such as, but not limited to, a front quarter panel and a fender. Fender squaring fixture 140 includes a pin 152 (in some embodiments, a manually operated pin may be used, in other embodiments, pin 152 may be pneumatic) that is configured to extend and retract. When a fender is mounted to fender squaring fixture 140 for attachment to a car frame, pin 152 is extended through a precise positioning hole in the fender. While in the extended position, pin 152 is used to set the fender stationary in a desired position. Additional bolts will be tightened while pin 152 is extended so that the fender is secured in the correct position. The extended pin 152 remains extended through the positioning hole in the fender while the fender is attached to the vehicle body. This procedure ensures precise and repeatable alignment of the fender during vehicle assembly.

As illustrated, sub-assembly 144 is attached to fender squaring fixture 140 and pneumatic pin 152 is attached to sub-assembly 146. With reconfigurable interface assembly 142 mounted between fender squaring fixture 140 and pneumatic pin 152, pneumatic pin 152 can be repositioned with respect to fender squaring fixture 140 along the X-axis and the Y-axis. This allows a single fender squaring fixture such as fender squaring fixture 140 to process multiple fenders having different configurations.

Figure 14:
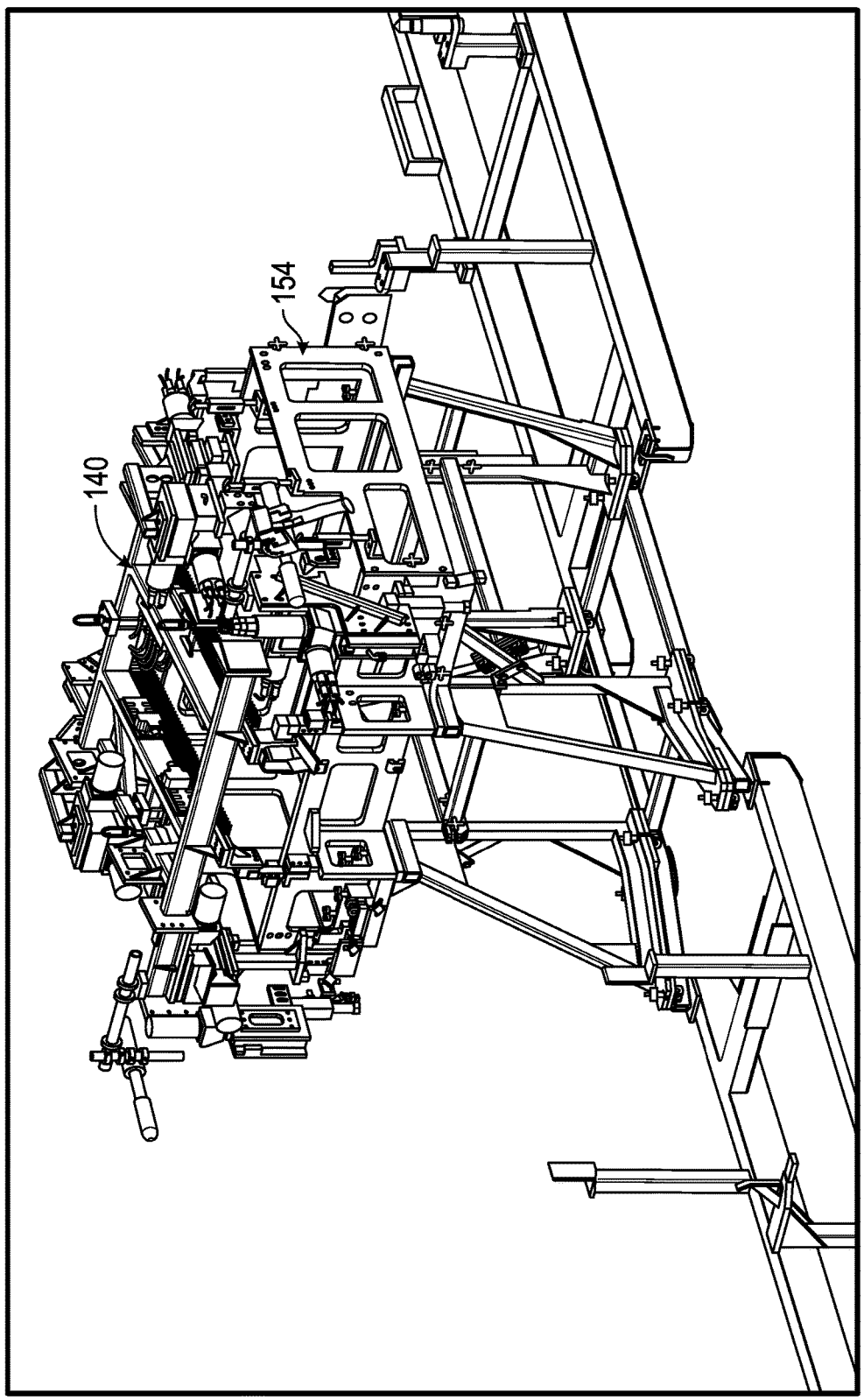
FIG. 14 is a perspective view illustrating a zeroing fixture for use with the fender squaring fixture of FIG. 13.

FIG. 14 is a perspective view illustrating a zeroing fixture 154 configured for use with fender squaring fixture 140. With continuing reference to FIG. 13, zeroing fixture 154 is used when there is a need to re-set the position of pneumatic pins 152 to positions that correspond to the bolt holes for the fenders of a vehicle being assembled. Under such circumstances, zeroing fixture 154 is positioned beneath fender squaring fixture 140 and the two devices are temporarily clamped together.

Figure 15:
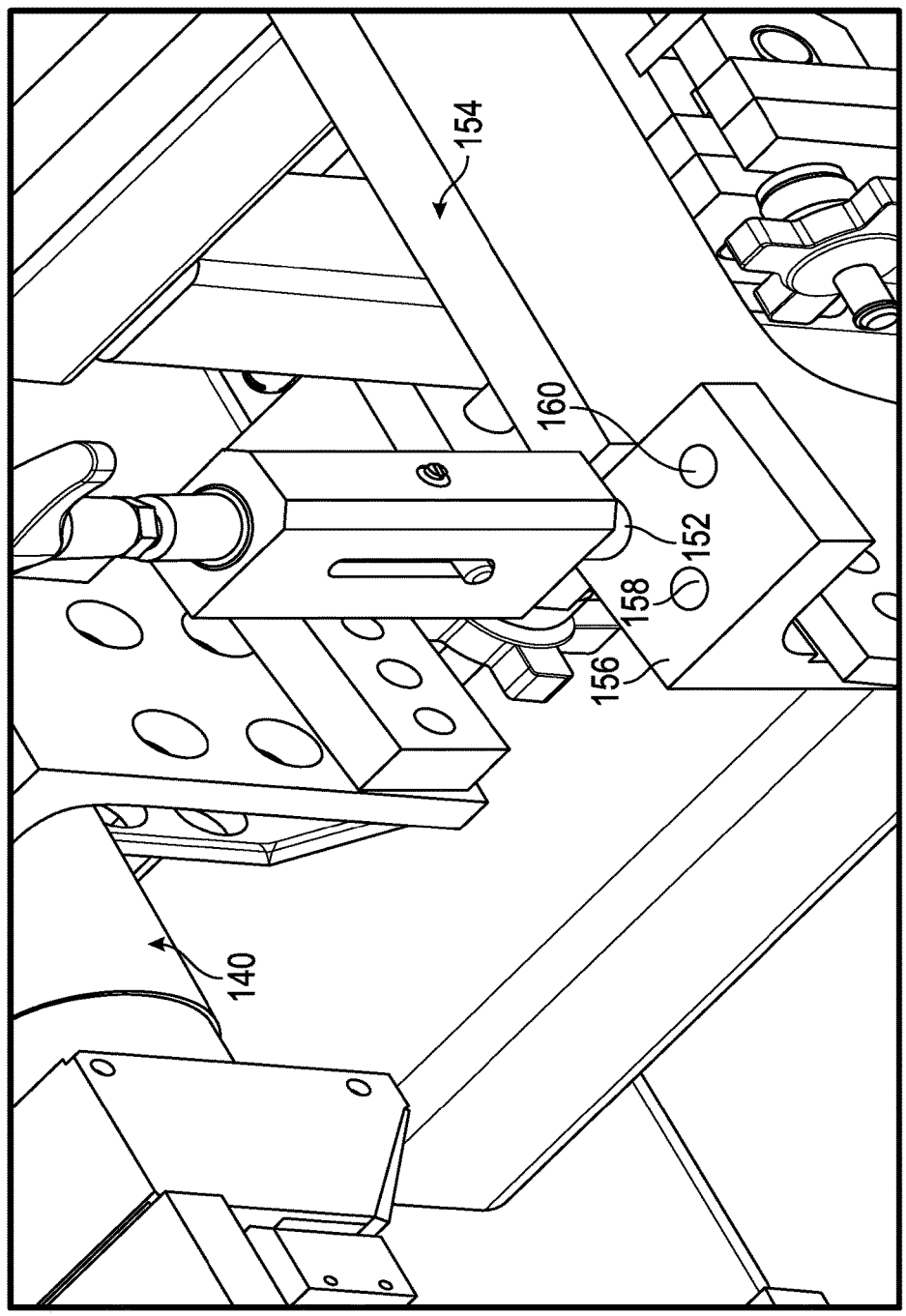
FIG. 15 is a close up perspective view illustrating a portion of the zeroing fixture of FIG. 14.

FIG. is an expanded perspective view illustrating a portion of zeroing fixture 154. The portion of zeroing fixture 154 illustrated includes a plate 156 having two holes 158 and 160 extending through plate 156. Holes 158 and 160 are positioned to simulate the location of bolt holes in the fender of the vehicle that fender squaring fixture 140 will be used with. Fender squaring fixture 140 is positioned above zeroing fixture 154 and pneumatic pin 152 is generally aligned with plate 156. Pneumatic pin 152 is then manually moved to align with bolt holes 158 and 160. When so aligned, pneumatic pin 152 is pushed downwardly to enter bolt holes 158 and 160. With continuing reference to FIGS. 13-15, while pneumatic pin 152 is extending into bolt holes 158 and 160, the position of sub-assembly 144 and sub-assembly 146 are learned by a controller associated with reconfigurable interface assembly 142 so that pneumatic pin 152 can later return to this exact position during vehicle assembly. Once reconfigurable interface assembly 142 has been "taught" where the bolt holes are located, fender squaring fixture 140 is unclamped from zeroing fixture 154 and is then placed back into service.

Figure 16:
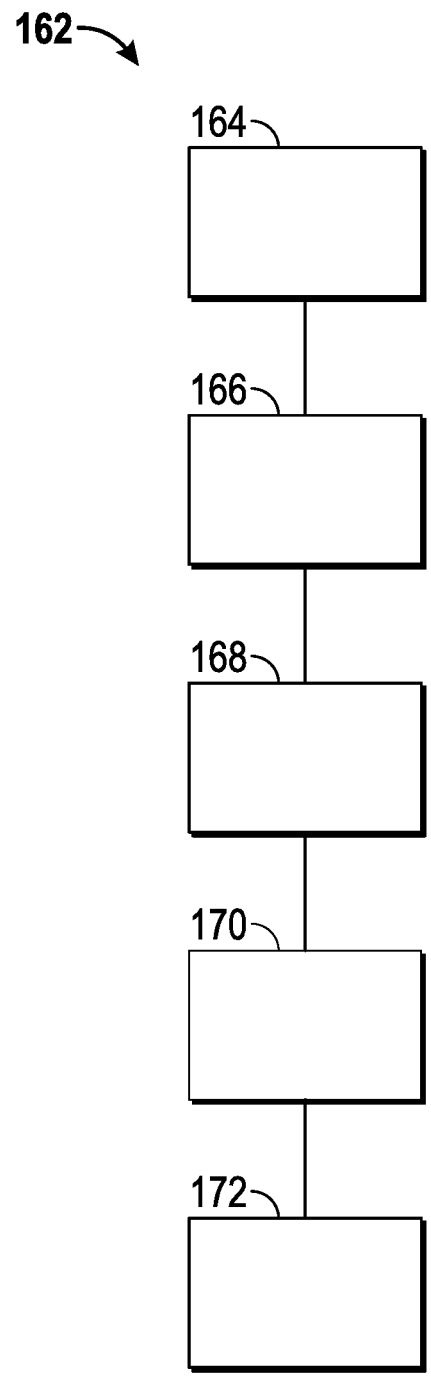
FIG. 16 is a flow diagram illustrating an exemplary method.

FIG. 16 illustrates an exemplary embodiment of a method 162 of assembly line manufacture in accordance with the teachings of the present disclosure. At step 164, a work-piece processor is adapted to receive a first work-piece, such as a body panel. To accomplish this, in some examples, a reconfigurable interface assembly (such as reconfigurable interface assembly 20 of FIG. 1) may be used to reposition a work-piece manipulator (such pair of pneumatic clamps 124 of FIG. 8) with respect to a work-piece supporter (such as robot 126 of FIG. 9) in order to accommodate the contours or the configuration of the work-piece. In some embodiments, a plurality of work-piece processors may be adapted to receive a respective plurality of work-pieces. For example, a robot may be adapted to retrieve a body panel from a table, the body panel being different in contour or configuration from a body panel that the robot most recently processed. Once the body panel is retrieved from the table, the table may be adapted to receive a body panel that is different in contour or configuration from the body panel that the table most recently supported.

At step 166, the work-piece is received at an adaptable assembly line work-piece processor. For example, robot 126 (see FIG. 9) equipped with end effector 120 (see FIG. 9) is an example of an adaptable assembly line work-piece processor that can be adapted to receive the work-piece. In some embodiments, the work-piece may be sequentially received by multiple adaptable assembly line work-piece processors as the work-piece moves through a work station. For example, a first body panel may be received at a table that has been adapted to receive the first body panel. A robot that has been adapted to receive the work-piece may then retrieve the body panel from the table.

At step 168, the adaptable assembly line work-piece processor performs an assembly line task with the work-piece. For example, table 134 (see FIG. 12) may support a body panel. In another example, robot 126 (see FIG. 9) may pick up and move a body panel from table 134 to a second position where the body panel is joined to another component. In some embodiments, the work-piece may have multiple assembly line tasks sequentially performed on it by different work-piece processors as the work-piece moves through the work station. For example, a body panel may first be positioned at a table, then picked up by a robot and moved to another location, where a second robot joins the work-piece to another component.

At step 170, the work-piece is removed from the adaptable assembly line work-piece processor. This has the effect of making room to receive the next work-piece. In some embodiments of method 162, the work piece may be sequentially removed from each work-piece processor at a work station. For example, the work-piece may first be removed from a table by a robot. The work-piece may them be removed from the robot by coupling the work-piece to another component.

At step 172, the adaptable assembly line work-piece processor is adapted to receive a second work-piece having a different configuration than the first work-piece. This is accomplished by reconfiguring the reconfigurable interface assembly associated with the adaptable assembly line work-piece processor so as to reposition its work-piece manipulator with respect to its work-piece supporter, and thereby permit it to accommodate a differently configured work-piece. For example, with continuing reference to FIGS. 3, 10, and 11, motor 58 of sub-assembly 24 may be actuated to cause sub-assembly 22 to move from an elevated position (illustrated in FIG. 10) to a lower position (illustrated in FIG. 11) to permit pair of pneumatic clamps 124 to clasp second body panel 132. In some embodiments, each work-piece processor at a work station may be adapted to receive the second work-piece.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An end of arm tool subassembly comprising a plurality of interconnected linear drive mechanisms for providing a plurality of directions of movement, each linear drive mechanism comprising:
   a base defining a longitudinal axis, the base having at least one mounting surface disposed parallel to the longitudinal axis and an end mounting surface disposed perpendicular to the longitudinal axis;
   a slide movably coupled to the base, the slide traversing in a direction parallel to the longitudinal axis, the slide having a slide mounting surface, wherein another of the plurality of linear drive mechanisms is secured to the end mounting surface of the base so as to provide two of the plurality of directions of movement for the end of arm tool subassembly;

at least one rail supported by the base;

a threaded lead screw rotatably supported by the base;

a motor for rotating the lead screw;

a slide carriage threadably coupled to the lead screw, the slide carriage traversing along the longitudinal axis as the lead screw rotates, wherein the slide is movable with the slide carriage and slidably coupled to the at least one rail; and a brake coupled to the slide.

2. The linear drive mechanism of claim 1, further comprising a plurality of mounting locations arranged along the mounting surface of the base.

3. The linear drive mechanism of claim 1, wherein each mounting surface comprises a plurality of mounting holes.

4. The linear drive mechanism of claim 1, wherein the at least one rail and the lead screw are arranged within an inner periphery of the base.

5. The linear drive mechanism of claim 1, wherein the brake is configured to inhibit movement of the linear drive mechanism.

6. The linear drive mechanism of claim 1, wherein the base is directly connected to a base of a third linear drive mechanism to form a rigid frame member having three of the plurality of directions of movement for the end of arm tool subassembly.

7. The linear drive mechanism of claim 6, wherein the plurality of linear drive mechanisms are reconfigurable between a first position and a second position, wherein the first position corresponds to a datum on a first workpiece and the second position corresponds to a datum on a second workpiece.

8. An end of arm tool subassembly comprising:

a mounting plate defining a first axis, the mounting plate having a plurality of mounting locations;

a first linear slide secured to the mounting plate at a first of the plurality of mounting locations, the first linear slide having a slide carriage movable along the first axis;

a second linear slide secured to the mounting plate at a second of the plurality of mounting locations, the second linear slide having a slide carriage movable along a second axis perpendicular to the first axis; and a third linear slide secured to one of the first and second linear slides, the third linear slide having a slide carriage movable along a third axis orthogonal to the first and second axis.

9. The end of arm tool subassembly of claim 8, wherein each of the first, second, and third linear slides further comprise:

a motor; and a lead screw rotationally driven by the motor, wherein the slide carriage is threadably coupled to the lead screw and movable thereon, the slide carriage being secured to the mounting plate at a slide carriage surface, wherein rotation of the lead screw provides movement of the associated first, second, or third linear slide with respect to the mounting plate.

10. The end of arm tool subassembly of claim 9, wherein each of the first, second, and third linear slides further comprise:

a brake movable with the slide carriage, wherein the brake, when actuated, inhibits movement of the slide carriage along the lead screw.

11. The end of arm tool subassembly of claim 8, wherein the first, second, and third linear slides provide a plurality of directions of movement along a Cartesian coordinate system.

12. The end of arm tool subassembly of claim 8, wherein the first linear slide is movable along an x-axis, the second linear slide is movable along a y-axis, and the third linear slide is movable along a z-axis.

13. The end of arm tool subassembly of claim 8, wherein the first, second, and third linear slides are reconfigurable between a first position and a second position, wherein the first position corresponds to a datum on a first workpiece and the second position corresponds to a datum on a second workpiece.

14. The end of arm tool subassembly of claim 13, wherein the first position and the second position are learned by a controller so as to automate movement of the first, second, and third linear slides between the first and second positions during operation.

15. A non-transitory computer storage medium encoded with a computer program, the program comprising instructions that when executed by a data processing apparatus cause the data processing apparatus to perform operations comprising:

determining at least two configurations of a plurality of linear slide mechanisms to form an end of arm tool subassembly, wherein each linear slide mechanism comprises a base and a slide carriage linearly traversable with respect to the base, and wherein the determination is based on an input of global coordinates of a first pick-up location of a first workpiece and a second pick-up location of a second workpiece to be manipulated by the end of arm tool.

16. The non-transitory computer storage medium of claim 15, wherein the determination is taught by using a squaring fixture.

17. The non-transitory computer storage medium of claim 15, wherein the program further comprises:

moving the plurality of linear slide mechanisms to a first configuration to receive the first workpiece; and moving the plurality of linear slide mechanisms to a second configuration to receive the second workpiece, wherein the first configuration is substantially different from the second configuration in at least one of the x, y, or z planes.

18. The non-transitory computer storage medium of claim 15, wherein the end of arm tool subassembly is configured to reposition the plurality of linear slide mechanisms to accommodate the first and second workpieces.

* * * * *